United States Patent

Rao

[11] Patent Number: 5,985,176
[45] Date of Patent: Nov. 16, 1999

[54] METHOD OF PREPARING HIGH BRIGHTNESS, SHORTER PERSISTENCE ZINC ORTHOSILICATE PHOSPHOR

[75] Inventor: Ravilisetty P. Rao, Highland, N.Y.

[73] Assignee: Matsushita Electric Industrial Co., Ltd., Osaka, Japan

[21] Appl. No.: 08/985,128

[22] Filed: Dec. 4, 1997

[51] Int. Cl.⁶ .............................. C09K 11/54; C09K 11/59
[52] U.S. Cl. ........................................................ 252/301.6 F
[58] Field of Search ........................................ 252/301.6 F

[56] References Cited

U.S. PATENT DOCUMENTS

| | | | |
|---|---|---|---|
| 2,252,500 | 8/1941 | Fonda et al. | 252/301.6 F |
| 3,541,019 | 11/1970 | Glemza et al. | 252/301.6 F |
| 4,390,449 | 6/1983 | Peters et al. | 252/301.6 R |
| 4,440,831 | 4/1984 | Brownlow et al. | 252/301.6 F |
| 4,551,397 | 11/1985 | Yaguchi et al. | 252/301.6 R |
| 5,188,763 | 2/1993 | Chenot et al. | 252/301.5 |
| 5,518,655 | 5/1996 | Morell et al. | 252/301.4 F |
| 5,611,961 | 3/1997 | Forster et al. | 252/301.6 F |
| 5,688,438 | 11/1997 | Chada | 252/301.4 F |

FOREIGN PATENT DOCUMENTS 1-272689  10/1989  Japan ............................... 252/301.6 F

OTHER PUBLICATIONS

M. Kotaisamy et al.; On the Formation of Flux Grown $Y_2O_2S:Eu^{3+}$ Red Phosphor; J. Electrochem. Soc., 142 (1995) 3205 no month.

R.P. Rao; Preparation and Characterization of Fine–Grain Yttrium–Based Phosphors by Sol–Gel Process; J. Electrochem. Soc., 143 (1996) 189 no month.

T.R.N. Kutty et al.; Luminescence of Eu2+ In Stronium Aluminates Prepared by the Hydro–thermal Method; Mat. Res. Bull., 25 (1990) 1355 no month.

*Primary Examiner*—C. Melissa Koslow
*Attorney, Agent, or Firm*—Ohlandt, Greeley, Ruggiero & Perle

[57] ABSTRACT

Improved zinc orthosilicate phosphor particles are produced by thermal decomposition of gels comprising zinc and manganese salt and an organic precursor that provides a source of silicon at a temperature below the temperature of solid state reaction. The phosphor of the present invention has the empirical formula:

$$Zn_{(2-x)}Mn_xSiO_4$$

wherein $0.005 \leq x \leq 0.15$, and provides a broad emission in a green region when excited by 147 nm and 172 nm radiation. The phosphor obtained by the present method has uniform spherical or needle shape particles having an average particle size in the range 0.1 to 3 microns, is appropriate for thin phosphor screens required for a variety of flat panel display and lamp applications. These phosphors exhibit high brightness and shorter decay when excited with 147 nm and 172 nm radiation than currently available commercial phosphors of this type.

10 Claims, 9 Drawing Sheets

METHOD OF PREPARING HIGH BRIGHTNESS, SHORTER PERSISTENCE ZINC ORTHOSILICATE PHOSPHOR

FIELD OF THE INVENTION

This invention relates to improved zinc silicate phosphor particles activated with manganese and a method of forming such particles. More specifically the invention relates to an improved method of forming such particles from nitrates and organic precursors, which form small phosphor particles that provide improved performance (higher brightness and shorter persistence) required for use in flat panel display (FPD) and lamp applications.

BACKGROUND OF THE INVENTION

Manganese activated zinc silicate ($Zn_2SiO_4:Mn^{2+}$) is an efficient green emitting photo- and cathodo-luminescent phosphor. In mineral form, zinc silicate is known as Willemite. When doped with Mn, it is commercially designated as P1 (short persistence phosphor for cathode ray tubes (CRTs) and lamps). When doped with Mn and As, Willemite is commercially designated as P39 (long persistence phosphor for special CRTs). This phosphor has been studied extensively and is currently used in plasma display panels (PDPs), CRTs and lamps due to its high quantum efficiency, persistence characteristics, color purity and reduced saturation. Mn activated Willemete has a rhombohedral structure (space group R3). The $Zn^{2+}$ ions occupy two in-equivalent sites, both having four oxygens (nearest neighbor) in a slightly distorted tetrahedral (Td) configuration. The emission (green) is attributed to the reversal of a d-orbital electron of the $Mn^{2+}$ (substitution of $Zn^{2+}$) ion. See D. T. Plumb and J. J. Brown, J. Electrochem Soc. 117 (1970) 1184.

These phosphors are conventionally prepared by high temperature (>1200° C.) solid state reaction (SSR) between ZnO (Zn source), $SiO_2$(Si source), $Mn_2O_3$ or $Mn(NO_3)_2$ (Mn source) and $NH_4F/NH_4Cl$ (flux). The grain size of the phosphor powders prepared by SSR are on the order of 5 to 20 microns. Flat panel display devices such as PDPs, field emission displays (FEDs) and electro-luminescence (EL) panels require thin fluorescent screens with fine grain (0.1 to 2 microns) phosphors for better performance and high efficiency. This requirement is more demanding in the case of PDPs, as the phosphors are screen printed between complicated structures, such as ribs. With small particles, it is possible to form a thin screen. Small particles also allow for a higher packing density and less binder content.

Originally, phosphors having a small particle size were obtained by grinding, crushing or milling large phosphor particles. Phosphors obtained by these methods displayed greatly reduced efficiency, with little or no control over the particle morphology. More recently, "no mill" phosphors have been prepared by rapid cooling of a phosphor mass after completion of SSR and with either a short-time firing at a higher temperature or a longer duration firing at a lower temperature. These processes help in minimizing further growth of phosphor crystals. In the presence of flux or inhibitors, particle size distribution (PSD) and morphology of the phosphor can be controlled. See M. Kotaisamy, R. Jagannthan, R. P. Rao, M. Avudaithai, L. K. Srinivasan and V. S. Sundaram, J. Electrochem Soc. 142 (1995) 3205; R. P. Rao, J. Electrochem Soc. 143 (1996) 189. It has been proposed that sub-micron particles can be synthesized by a sol-gel process. See T. R. N. Kutty, R Jagannthan, R. P. Rao, Mater. Res. Bull. 25 (1990)1355. Small phosphor particles have been synthesized by hydrothermal methods. See R. N. Bhargava, D. Gallagher, T. Welker, J. Luminescene 60 (1994) 280.

Most past work on zinc silicate phosphors has been related to fluorescent lamp development and the performance of the phosphor therein, either alone in green lamps, or in white lamps with phosphor blends having zinc silicate as one component. Different methods of preparation and the introduction of various impurities were tried in attempts to improve the life of the lamp. U.S. Pat. No. 4,208,448 to Panaccione teaches that the life of the phosphor is improved by washing the phosphor with an organic acid solution (e.g., acetic, succinic or terephthalic acid) before application to the inside of the lamp envelope. Trace amounts of alkali metals, such as Mg, have been added to zinc silicate in addition to Mn and As to obtain superior persistence at higher drive levels. A practical application of this phosphor is in CRTs (see U.S. Pat. No. 4,315,190).

U.S. Pat. No. 4,440,831 to Brownlow et. al. describes an improved process for synthesizing zinc silicate in which phosphor particles are formed by using small size silicic acid particles coated on ZnO and $Mn_2O_3$ along with $H_2O$, $H_2O_2$, $HNO_3$ and $NH_4OH$ and fired at high temperatures. This phosphor was shown to display increased brightness. However, persistence also increased compared to conventional phosphors. The addition of alkaline earth elements (Mg, Ca, Sr), Na and either Bi or Sb, along with Mn and As, to a zinc silicate phosphor minimizes degradation and allows for easy blending with other phosphors (blue and red) in a special type CRTs according to U.S. Pat. No. 4,551,397 to Yaguchi et. al. A small quantity of tungsten has been shown to improve lamp life and brightness (U.S. Pat. No. 4,728, 459). The application of a non-particulate, conformal aluminum oxide coating to the outer surface of individual particles also improves lamp life (see U.S. Pat. Nos. 4,892, 757, 4,925,703 and 4,956,202 to Kasenga et al.). The reflectance of phosphor particles before surface treatment can enhanced by washing the phosphor particles with citric acid (U.S. Pat. No. 5,039,449). U.S. Pat No. 5,188,763 to Chenot discloses that the addition of $MgF_2$ to a $NH_4Cl$ flux in the starting ingredients, is essential for achieving a white bodied phosphor. U.S. Pat. No. 5,611,961 to Forster et al. describes the synthesis of a zinc orthosilicate using fumed silica having an ultra fine average particle size of less than 50 nm by firing at higher temperatures in an inert atmosphere.

As noted above, most of the earlier patent work on zinc silicate phosphors relates to lamps and long persistence (>20 ms) CRTs. However, long persistence phosphors are not suitable for today's high performance TV display applications, as long persistence creates superimposed images (a ghost effect). Therefore, there is a need for a phosphor capable of achieving a 5–10 ms persistence (the sensitivity of human eye for video images) without sacrificing brightness. The optimum concentration of Mn in the phosphor is very critical. After exceeding a specific Mn concentration, there is a marked decrease in brightness, although persistence will decrease continuously with increased Mn concentration. This forces a tradeoff between brightness and persistence. Also, since most synthesis methods involve high temperature solid state reactions, the control over the impurity concentration (effective doping of $Mn^{2+}$ into the crystal lattice), PSD and morphology is limited. It has been found that phosphor screens formed with smaller particles (0.5 to 2.0 microns) exhibit improved performance. This is particularly true for PDPs. However, most of the above methods fail to provide small particles (0.1 to 2.0 microns).

SUMMARY OF THE INVENTION

Accordingly, it is an object of the present invention to provide a Mn$^{2+}$ activated zinc orthosilicate phosphor having the empirical formula $$Zn_{(2-x)}Mn_xSiO_4$$

wherein: $0.005<x<0.15$, which method provides the phosphor in the form of a powder having a small particle size which displays improved brightness and decreased persistence.

The fine grain phosphors of the present invention are synthesized by a sol-gel process. Sols are dispersions of colloidal particles in a liquid. The gravitational forces on the particles are negligible. From a sol, a gel can be formed with an interconnected, rigid network, having sub-micrometer pores and a polymeric chain with an average length on the order of microns. The particle size of the finished product is a function of the initial concentration of colloidal particles in the starting sols, the gelation process, the manner in which the gels are dried, calcination temperature and rate of cooling.

A sol-gel process offers many advantages over conventional methods in the synthesis of fine powders and particularly in the synthesis of fine phosphor powders. Since all of the starting materials are mixed at the molecular level in a solution, a high degree of homogeneity is achievable. Doping of impurities (activators/coactivators/sensitizers) through solutions is straightforward, easy and effective. The pores in properly dried gels are often extremely small and the components of a homogenous gel are intimately mixed. The surface area of powders produced from a sol-gel are very high, allowing for the use of lower processing temperatures.

Phosphor materials formed by the sol-gel process of the present invention have an improved morphology, and are well suited for use in paste formulations used in the fabrication of phosphor screens, such as pastes for screen printing and slurries. Further, due to the purity and small size of the phosphor particles formed using the sol-gel process, many post-processing steps, such as washing to remove flux and flux related materials, and grinding/milling needed to reduce the size of the phosphor particles can be eliminated.

Phosphor materials are extremely sensitive to impurities, even in ppb levels. The low-temperature sol-gel synthesis process minimizes the potential for cross contamination. Some of the unwanted impurities left in the materials from conventional methods may pose a threat to the performance of a phosphor. For example, fluoride from the flux (MgF$_2$) can attack the glass surface of the display during operation. As the size of the phosphor particle decreases, the probability of electron and hole capture due to the presence of impurities increases and the electron/hole localization enhances the recombination rate via the impurity. See R. N. Bhargava, D. Gallagher and T. Welker, J. Luminescence 60&60 (1994) 280. The optimum impurity concentration (activator) level can be further increased by small particle size. See R. Rossetti, R. Hull, J. M. Gibson and L. E. Brus, J. Chem. Phys. 82 (1985) 552. The present invention, which grows an Mn$^{2+}$ activated zinc silicate phosphor by a sol-gel process provides materials that exhibit shorter persistence, higher brightness and smaller particle size. The small particle size of phosphor particles formed by a sol-gel process make them particularly suitable for use in applications in which high packing density is required.

More specifically, the present invention provides a method for forming a manganese activated zinc silicate phosphor having the empirical formula:

$$Zn_{(2-x)}Mn_xSiO_4$$

wherein $0.005<x<0.15$ and wherein all the manganese activator occupies available zinc sites as Mn$^{2+}$. This method includes the steps of:

(1) reacting a dilute solution comprising a source of zinc, a source of manganese and an organic precursor providing a source of silicon, in an acid or a base medium to form a gel; and (2) thermally decomposing the gel at a temperature below a solid state reaction temperature.

The method of preparing phosphors in accord with the invention may employ zinc nitrate as a source of zinc and the resulting phosphor has spherical particles with particle sizes in the range of 0.1 to 3.0 microns. The method may also use zinc chloride as the source of zinc and the resulting phosphor has needle-shaped particles with particle sizes in the range of 0.1 to 3.0 microns. A preferred phosphor comprises from about 51.5 wt. % to about 57 wt. % zinc, from about 13.6 wt. % to about 16.1 wt. % silicon and about 3 wt. % manganese. It is also preferred that the phosphor be substantially free from flux contamination. Phosphors in accord with the invention are usable for fabricating phosphor screens.

DETAILED DESCRIPTION OF THE INVENTION

Figure 1A:
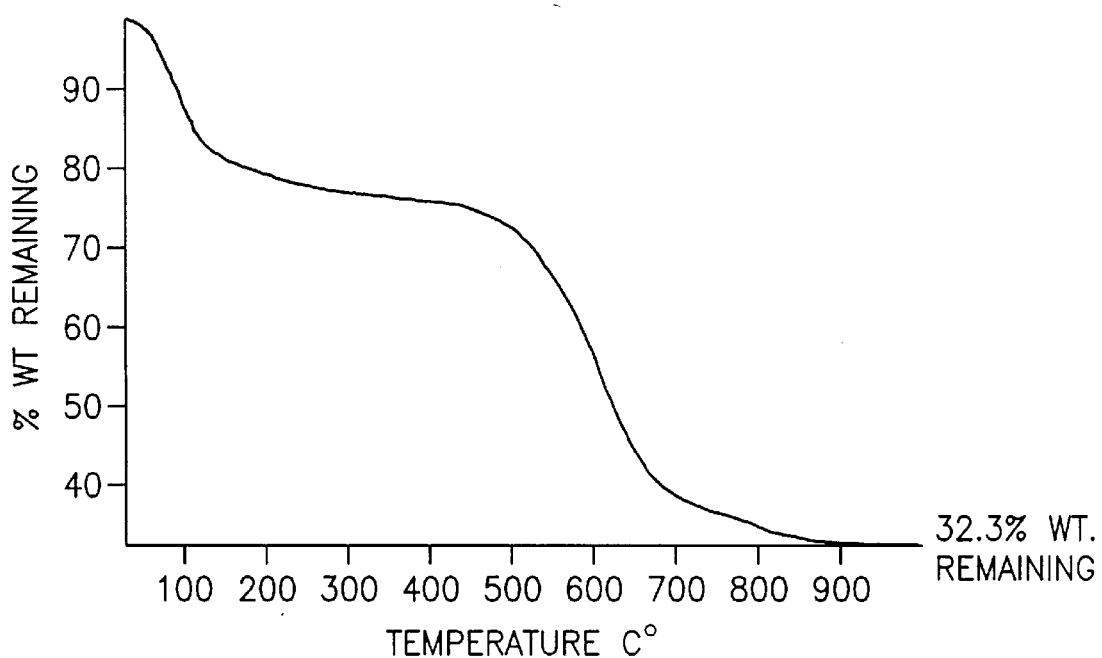
FIG. 1 provides a Thermo-Gravimetric Analysis (TGA) of zinc silicate xerogel powders including a) an acid catalyzed gel with zinc nitrate, b) an acid catalyzed gel with zinc chloride, c) a base catalyzed gel with zinc nitrate preheated to 400° C. and d) a base catalyzed with zinc chloride preheated to 400° C.
Figure 1B:
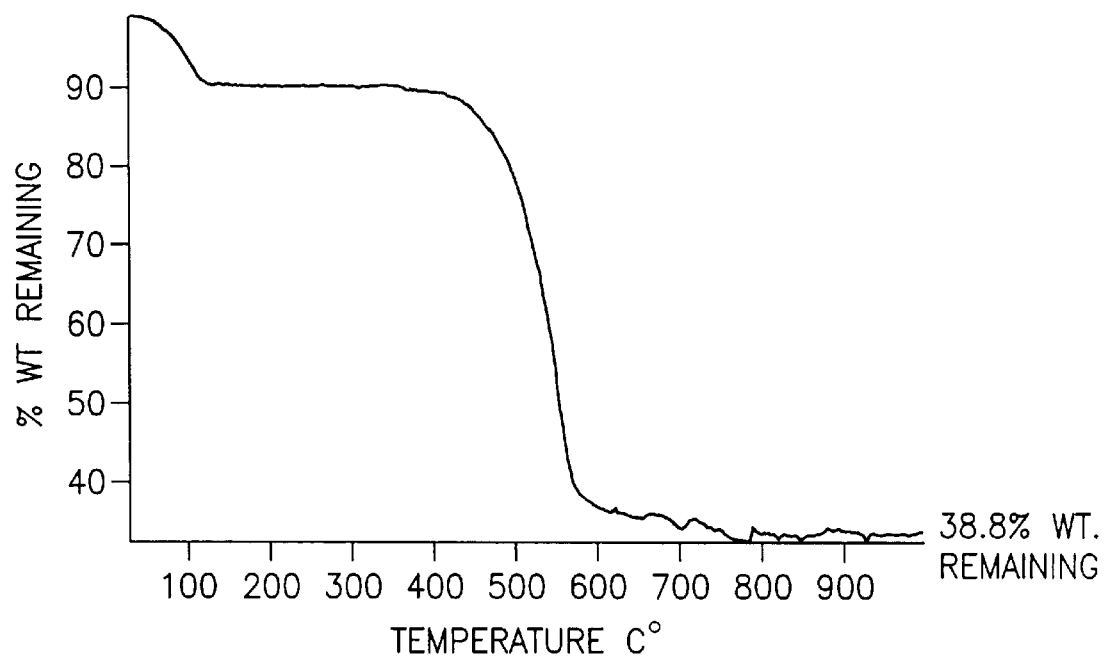
Figure 1C:
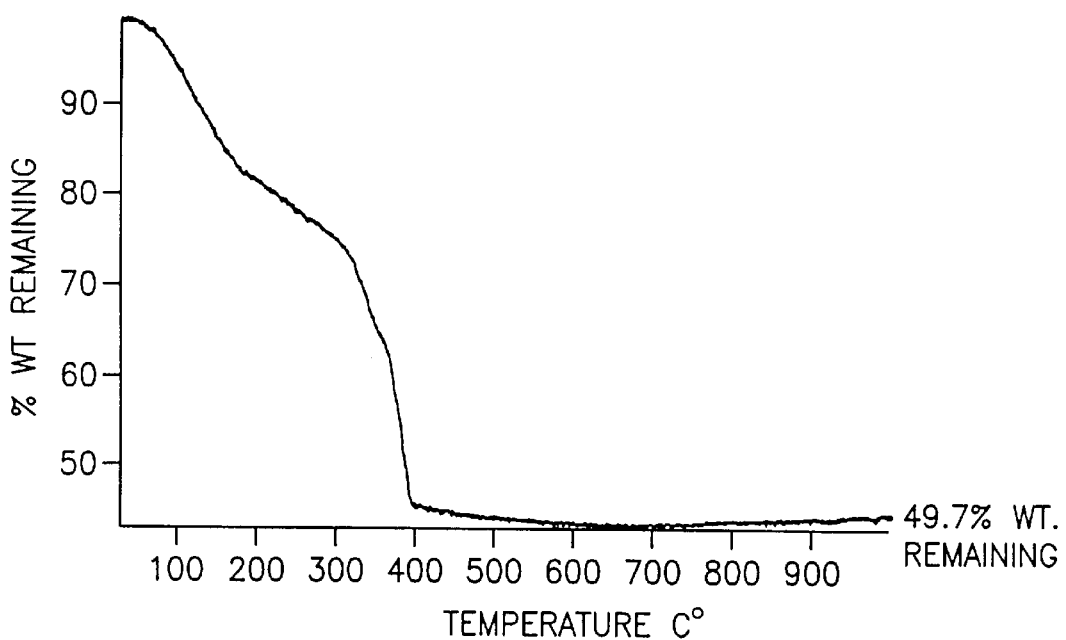
Figure 1D:
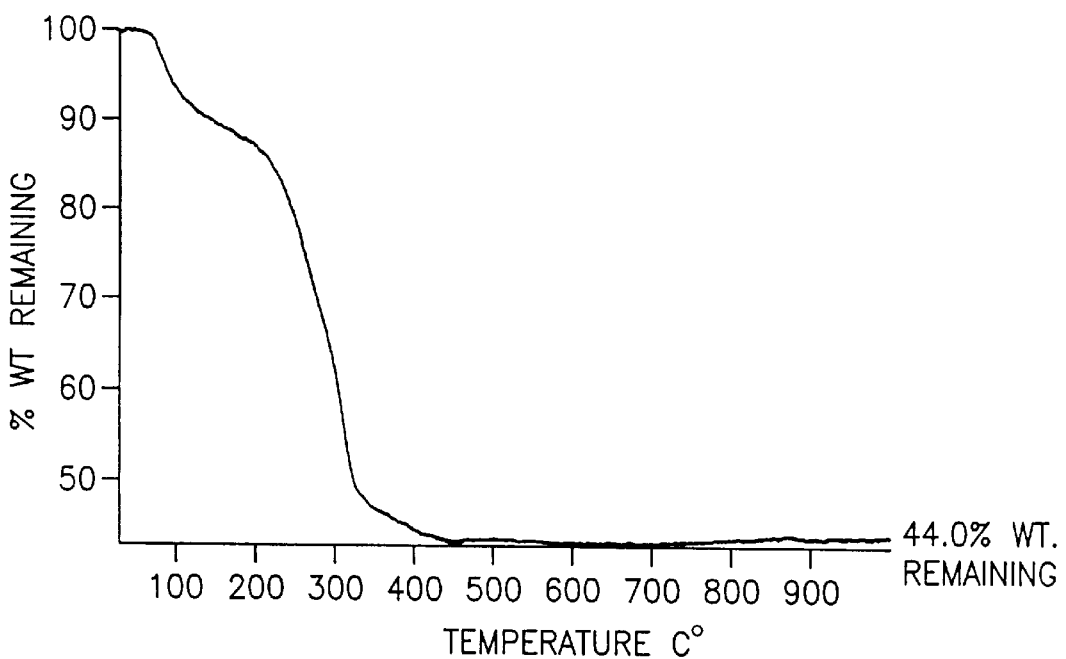

There are a number of display applications in which a green phosphor with high brightness, shorter persistence, color purity (saturation) and long life (time of operation)

would significantly improve a display's performance. Since commercially available zinc silicate phosphors fail to satisfy all the above requirements, a phosphor synthesis process that overcomes the above limitations was developed. The result of this development effort is the basis of the present invention.

The invention provides a method of synthesizing zinc orthosilicate phosphors incorporating high concentrations of activator ion ($Mn^{2+}$). The solubility of $Mn^{2+}$ in a solid solution of zinc silicate is high, but when it is subjected to high temperature, $Mn^{2+}$ may form a separate phase instead of entering into a $Zn^{2+}$ site vacancy. Also, heating can cause the $Mn^{2+}$ to oxidize to higher valence manganese cations ($Mn^{3+}$ and $Mn^{4+}$). Higher valence Mn ions not only reduce the number of $Mn^{2+}$ ions available for luminescence processes reduce the overall luminescence efficiency.

The sol-gel processes of the present invention can be divided into two categories; (1) aqueous-based processes that start from a solution of a metal salt; and (2) alcohol-based processes that start from a metal alkoxide. The most suitable process is based primarily on the cost and availability of the starting chemicals. Since the purity of starting chemicals is important to the synthesis of phosphors and as zinc alkoxides are expensive, zinc nitrate and zinc chloride are particularly suitable sources of zinc and silicon alkoxides, particularly tetraethylorthosilicate (TEOS) is particularly well suited as a Si source. High purity TEOS is readily available. Initially, a TEOS stock solution is hydrolysed (Eq.1) and polymerized (Eq.2). The resulting TEOS polymer (99.9% pure) is then mixed with distilled water (DI) to form a solution. As water and TEOS are immiscible, vigorous shaking is required.

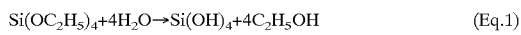

$$Si(OC_2H_5)_4 + 4H_2O \rightarrow Si(OH)_4 + 4C_2H_5OH \qquad (Eq.1)$$

$$Si-OH + OH-Si = Si-O-Si + H_2O \qquad (Eq.2)$$

To the above solution (500 CC is used as a basis), 1000 CC of ethyl alcohol (EtOH) is added, while stirring, at room temperature. The pH of the solution can be adjusted t o between about 1.9 and about 2.0 by adding a concentrated acid ($HNO_3$). A lower pH helps to accelerate the formation of a continuous three dimensional silicon-oxygen network. To allow the reaction to proceed, the solution is left to stand in a closed flask at 60° C. f or 24 hours.

Stoichiomtric quantities of metal (Zn, Mn) solution s are then added to the TEOS solution such that a metal to silicon ratio (Zn/Si) is maintained within a range from about 1.9 to about 2.1. The Zn and solutions are prepared by mixing an appropriate hydrated metal compound (e.g., $Zn(NO_3)_2$ $xH_2O$, $ZnCl_2$ $xH_2O$ or $Mn(NO_3)_2.xH_2O$) in lukewarm DI water to obtain 0.05 to 0.1 M solutions. The resulting Zn/Mn/Si solution is then gelled by peptizing at 80 to 100° C. for 12 to 18 hours in a stirrer mantle.

Gelation can be carried out with either acid catalyzed sols (pH=1.0 to 2.0) or base catalyzed sols (pH=8.0 to 9.0). In acid catalyzed sols with sufficient water, the hydrolysis of TEOS is rapid and precedes the condensation reaction. In base catalyzed sols, the hydrolysis occurs concurrently with the condensation of partially hydrolysized TEOS. With low pH sols, it is believed that pepitization requires that an acid be introduced into the solution. Acid additions are generally specified in terms of acid type and pH. The type of acid is more important than pH. In the present invention, two different acids ($HNO_3$ and $HCl$) have been found to be particularly useful as peptizing agents that lead to the formation of structurally homogeneous gel networks.

With high pH sols, an amount of ammonium hydroxide is added dropwise to the sols with constant stirring. Gelation results in the formation of a fine precipitate. After the peptization, the sol/gels are left for a few days (3 to 5) in a container (crystallizing dish) until it thickens. The thickened gel is then dried in a lab oven at 50° C. to 60° C. to form a xerogel. The xerogel, a transparent substance, is subjected to two heat cycles. In first heat cycle, the sample is soaked for 2 hours at 100° C. and then heated to 400° C. for about 2 hours. After cooling to room temperature, the xerogel is crushed gently (e.g., in a ball mill). The resulting crushed powder is then heat treated at 900° C. to 1200° C. for 2 to 12 hours in a high temperature furnace.

Thermal anlaysis data on several samples including: a) low pH sol with nitrate; b) low pH sol with chloride; c) high pH sol with nitrate; and d) high pH sol with chloride is presented in FIG. 1. This data reveals that the gels have undergone two to three successive weight changes in two to three different temperature regions. The first weight change occurs around 100° C. and corresponds to the loss of free water molecules associated with the TEOS and respective metal salt solutions. The second weight loss, around 200 to 300° C., is due to the loss of $-OC_2H_5$ through thermally accelerated oxidation. The mechanism by which the $-OC_2H_5$ moiety is removed may involve any combination of reactions as shown in Eqs. 3 to 5. See P. Maniar, A. Navrotsky, E. M. Rabinovich, D. L. Wood and N. A. Kopylov, Mat Res. Soc. Symp. Proc. 121(1988) 323.

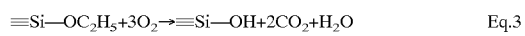
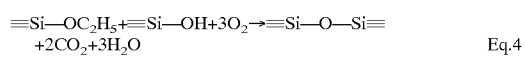
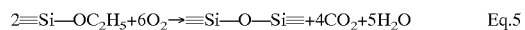

$$\equiv Si-OC_2H_5 + 3O_2 \rightarrow \equiv Si-OH + 2CO_2 + H_2O \qquad Eq.3$$

$$\equiv Si-OC_2H_5 + \equiv Si-OH + 3O_2 \rightarrow \equiv Si-O-Si\equiv + 2CO_2 + 3H_2O \qquad Eq.4$$

$$2\equiv Si-OC_2H_5 + 6O_2 \rightarrow \equiv Si-O-Si\equiv + 4CO_2 + 5H_2O \qquad Eq.5$$

Figure 2A:
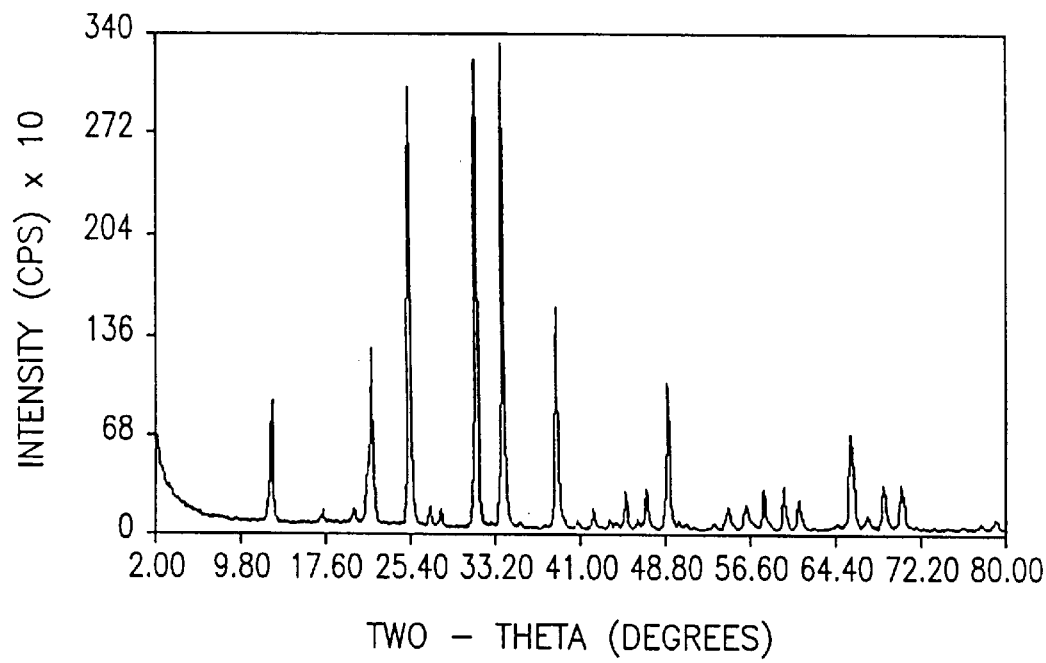
FIG. 2 shows X-ray diffraction patterns of Mn activated zinc silicate phosphors prepared by a sol-gel process from a) zinc nitrate and b) zinc chloride.
Figure 2B:
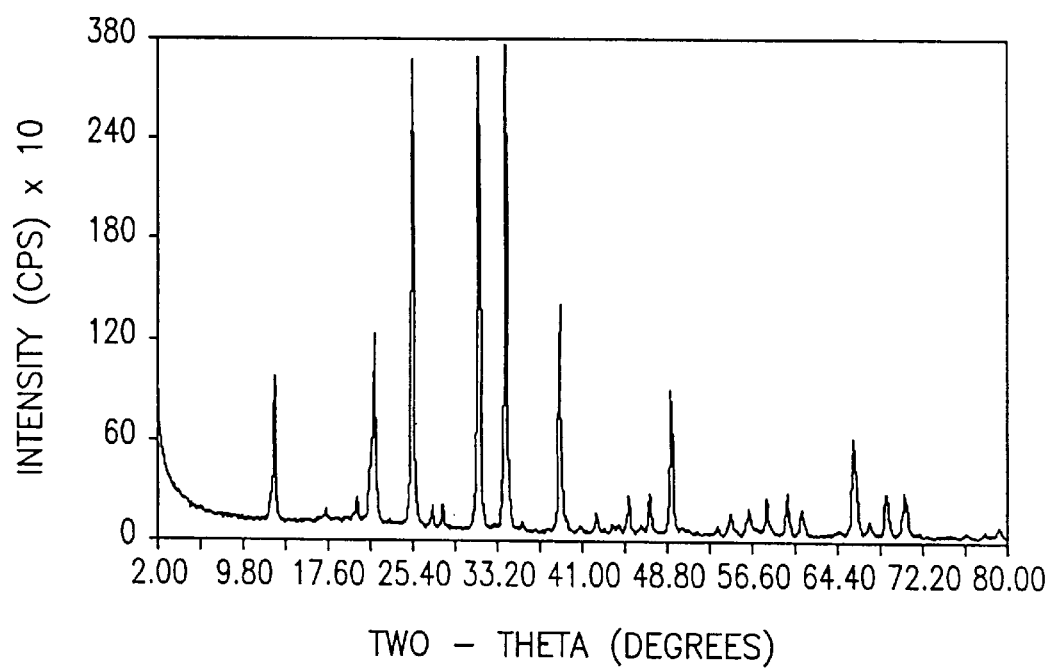

From the exothermic results, one can conclude that the formation of Mn activated zinc silicate phosphor begins above 700° C. X-ray powder diffraction data on samples fired at 950° C. is shown in FIG. 2. The samples fired at 650° C. show only some lines corresponding to the Zinc silicate phase. In contrast, all the prominent lines corresponding to a Zinc silicate phase are observed in samples fired above 900° C. This indicates that the samples are completely converted to zinc silicate. This conclusion is also supported by TGA data. The lines corresponding to a zinc silicate phase are more prominent with increased firing temperature.

Figure 3A:
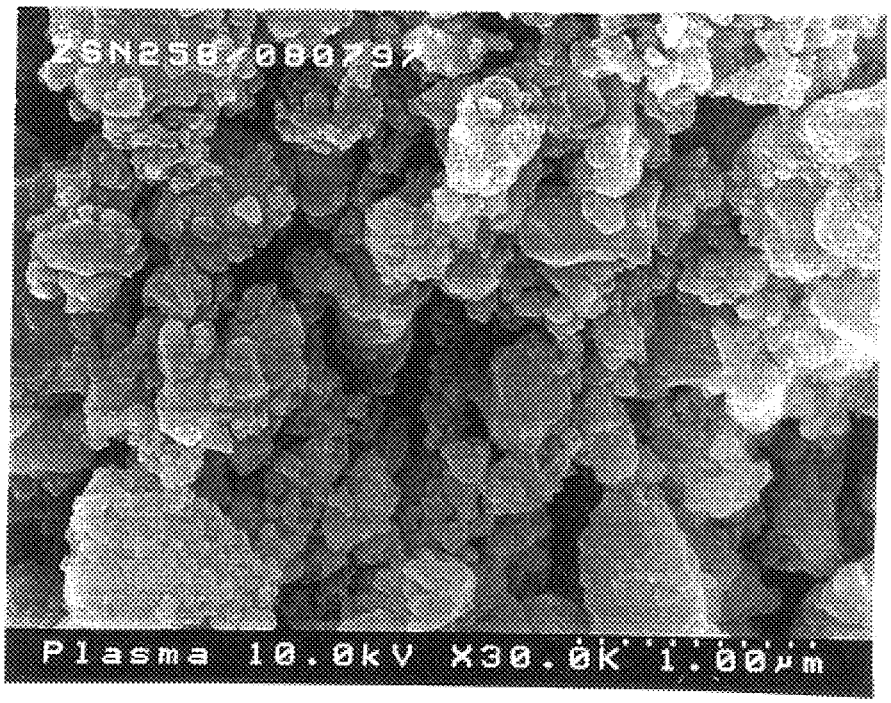
FIG. 3 illustrates scanning electron micrographs of zinc silicate phosphors prepared by a sol-gel process from a) zinc nitrate (acid catalyzed) and b) zinc chloride (base catalyzed)
Figure 3B:
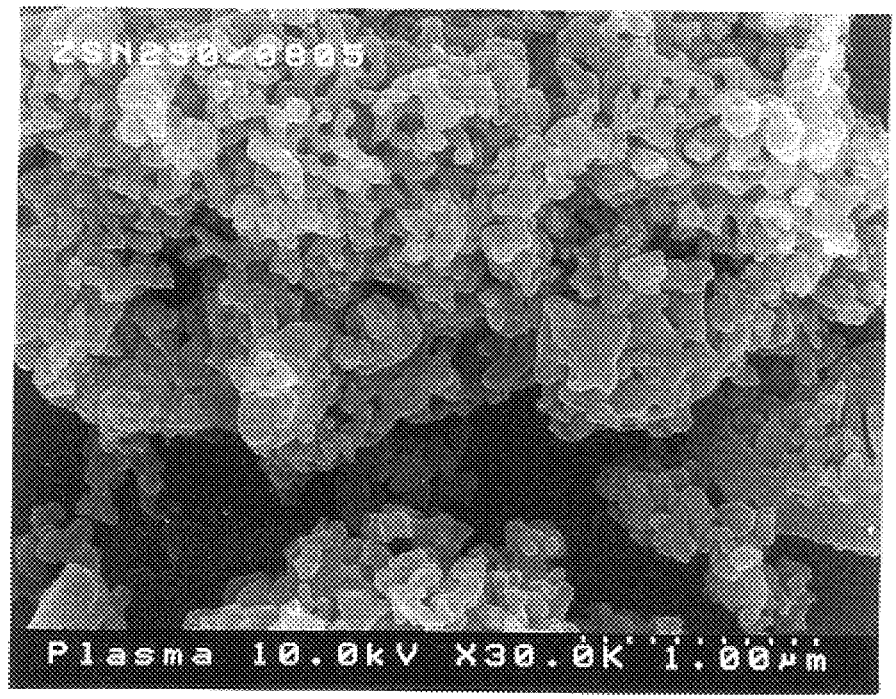
Figure 4A:
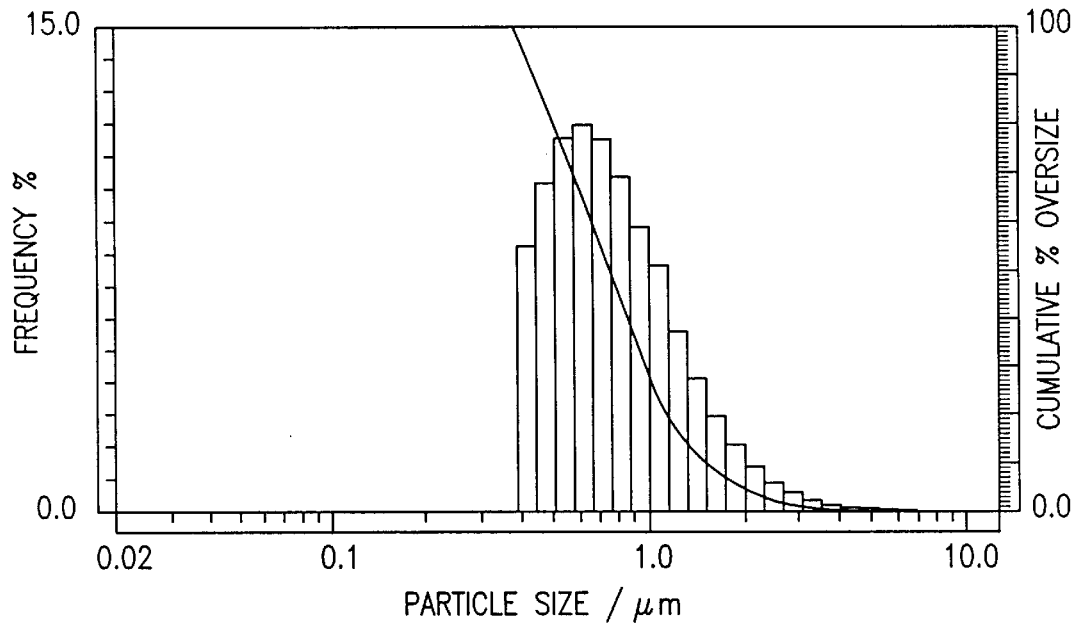
FIG. 4 graphs the particle size distribution of zinc silicate phosphors prepared by a sol-gel process from a) zinc nitrate (acid catalyzed) and b) zinc chloride (base catalyzed)
Figure 4B:
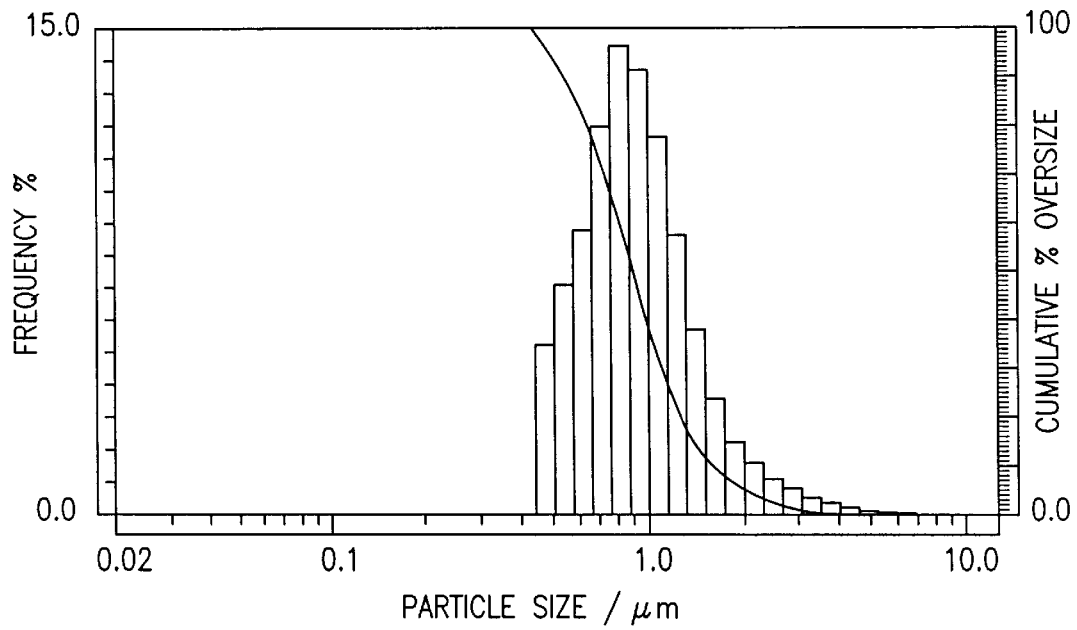

Since the luminescence of a phosphor depends on the shape, size, crystallinity, defects and grain boundaries, the morphology and PSD of samples prepared under various conditions were studied. Scanning electron micrographs of phosphor samples prepared from nitrate and chlorides are shown in FIG. 3. From these micrographs one can observe that phosphors prepared from nitrates exhibit spherical shapes whereas phosphors from chloride show needle like particles. Phosphors fired at very high temperatures (>1200° C.) show the fusion of smaller particles into larger particles (>10 microns). The PSD of phosphors prepared at different temperatures are shown in FIG. 4. The samples are washed with water or mild acid (0.001M citric acid or acetic acid) after calcination to eliminate very small particles (<0.05 microns). After acid washing, the powders are washed with DI water and dried at 100° C. for 6 to 12 hours. The emission and decay characteristics of these phosphors were carried out on powders as well as coated screens at room temperature.

Figure 5:
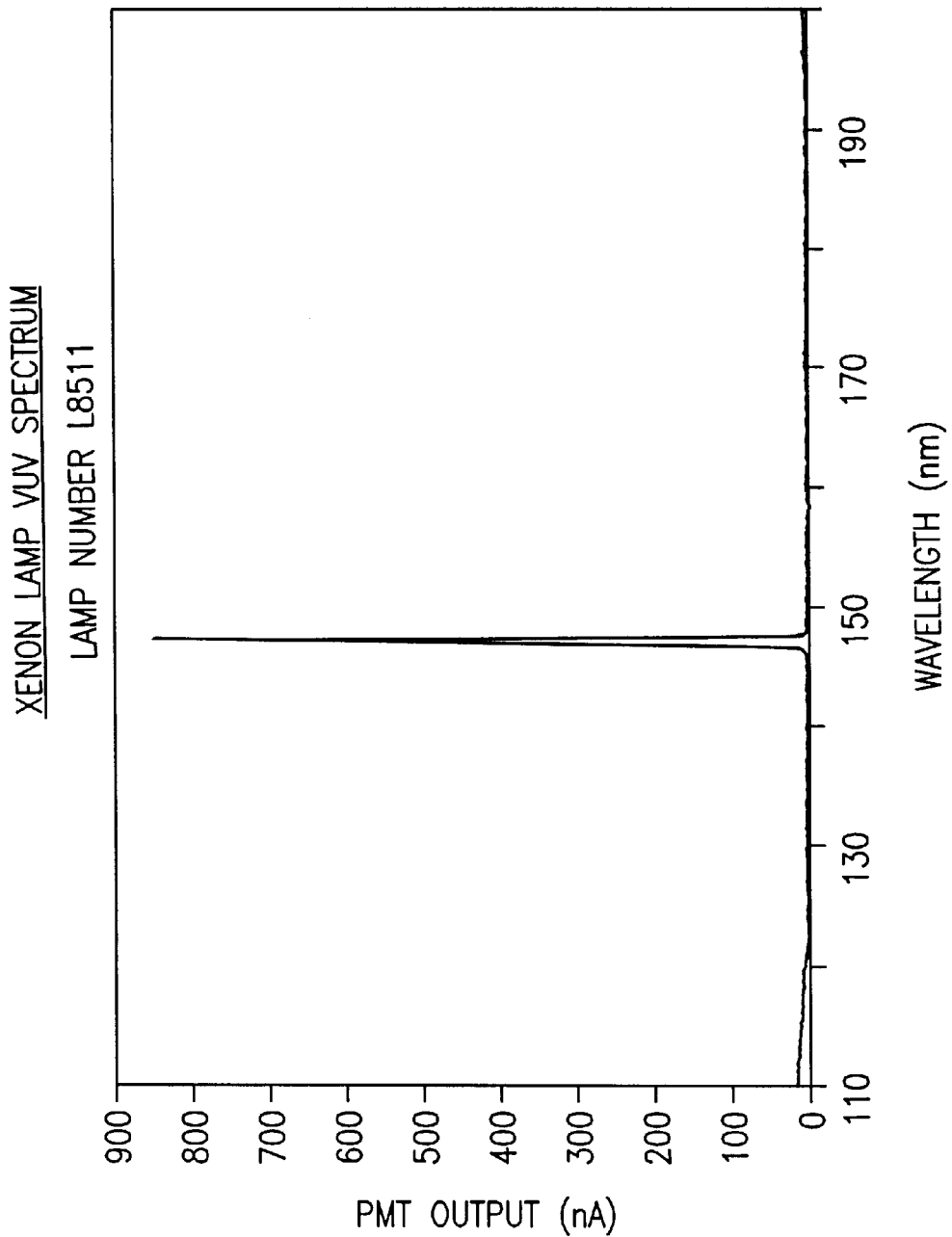
FIG. 5 provides the spectral distribution of radiation energy from a Xe lamp with a MgF$_2$ window.
Figure 6A:
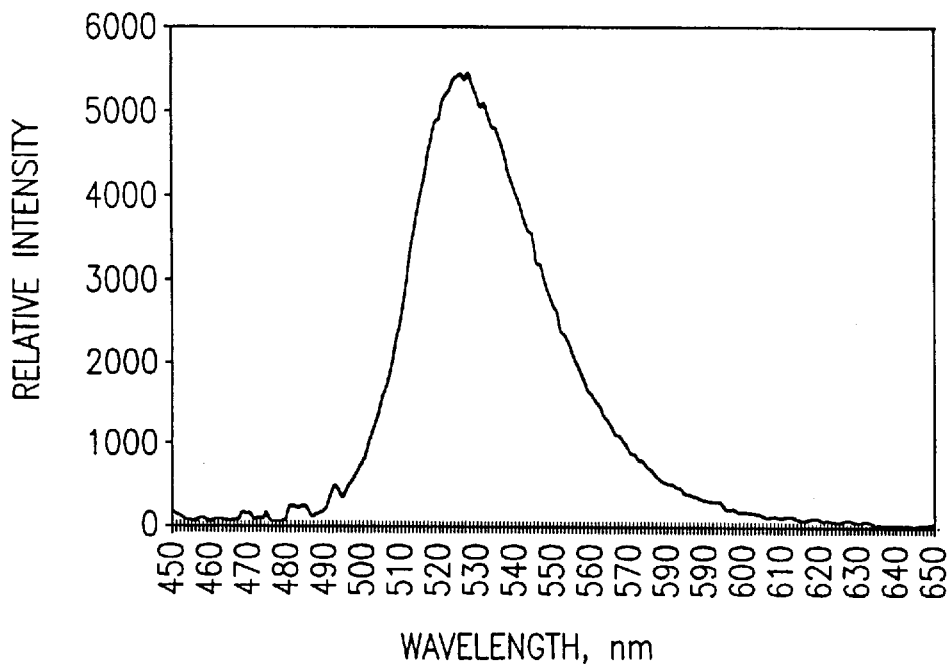
FIG. 6 shows the emission spectra of zinc silicate phosphors prepared from acid catalyzed a) zinc nitrate and b) zinc chloride by sol-gel process using 147 nm excitation (Xenon lamp) recorded at room temperature.
Figure 6B:
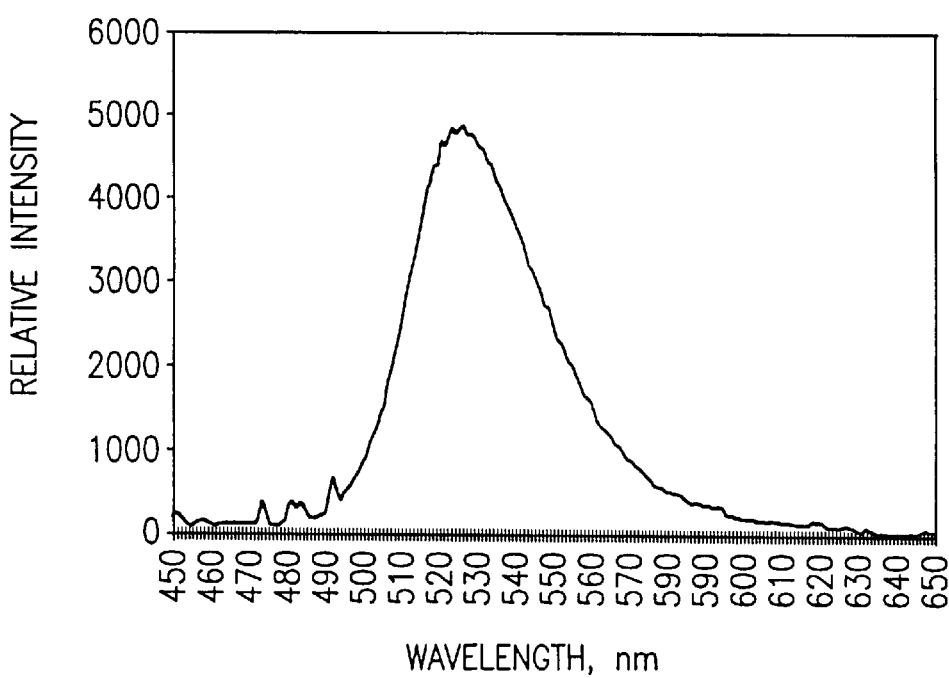
Figure 7A:
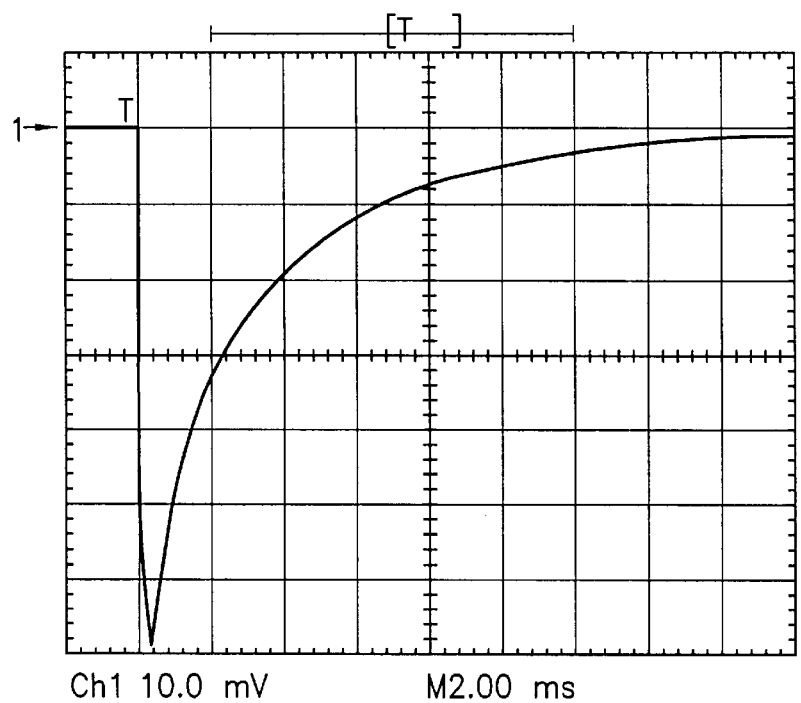
FIG. 7 shows persistence (decay) of zinc silicate phosphors prepared from acid catalyzed a) zinc nitrate and b) zinc chloride, after excitation (Xenon flash lamp) recorded at room temperature.
Figure 7B:
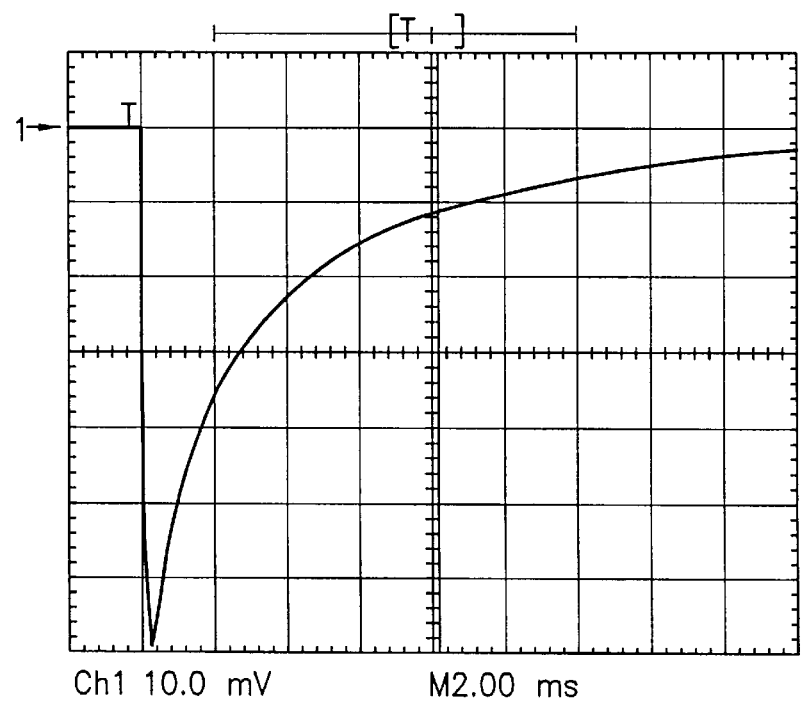
Figure 8A:
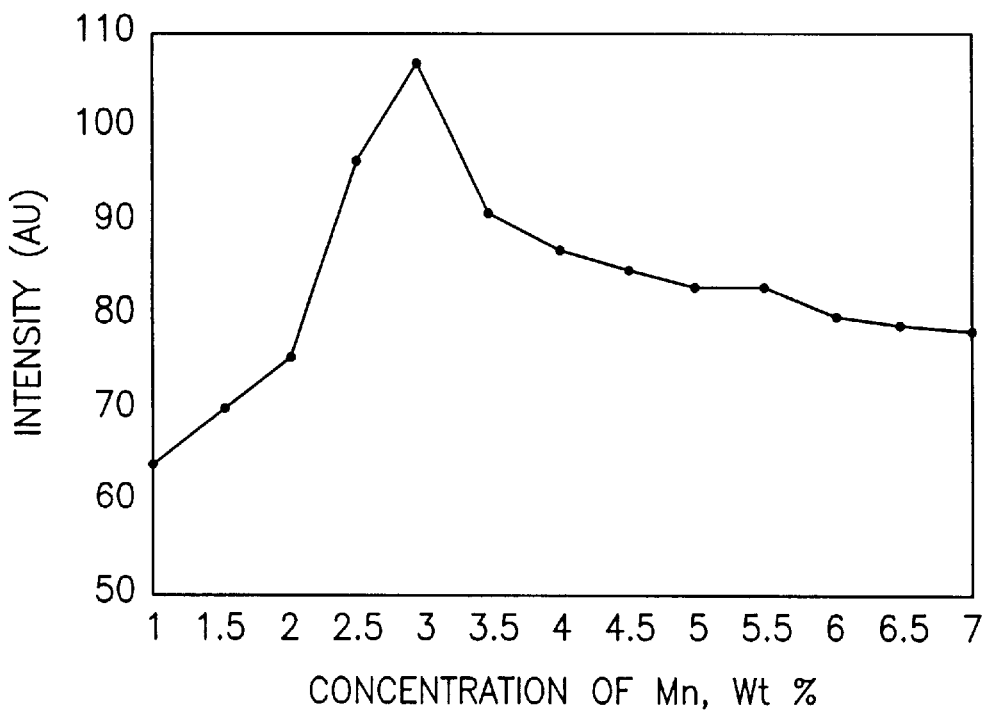
FIG. 8a illustrates the variation of intensity of zinc silicate phosphors prepared with Mn concentration (147 nm excitation wavelength)
Figure 8B:
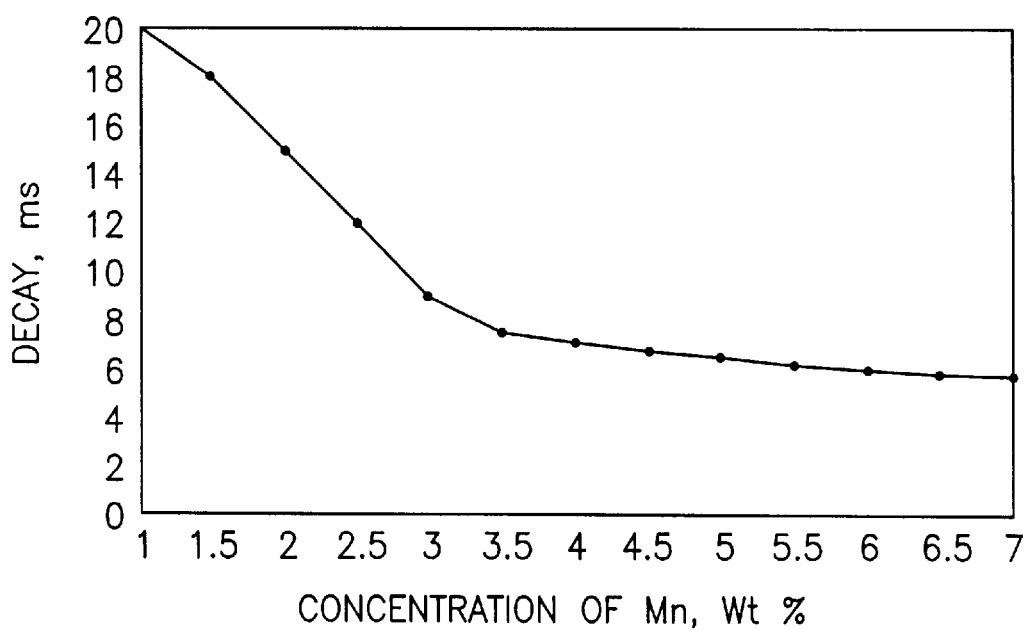
FIG. 8b shows variation of decay time of zinc silicate phosphor prepared with Mn concentration.

FIG. 5 represents the spectral distribution of radiation energy from a Xenon lamp with a $MgF_2$ window. The emission spectra of Mn activated zinc silicate phosphors prepared from zinc nitrate and zinc chloride are shown in FIGS. 6a and 6b, respectively. In general, the emission peak is in the green region. The peak maximum depends on the Mn concentration and varies over a range from about 520 to about 530 nm. For a number of display applications, a peak maximum between 520 to 530 nm is quite acceptable. The persistence, or afterglow decay, curves of Mn activated zinc silicate prepared from zinc nitrate and chloride are presented in FIG. 7. The phosphor luminescence intensity depends on the concentration of activator (Mn). Phosphor luminescence intensity increases with concentration up to 3.0 wt. % Mn and decreases with further increases in Mn concentration. The decrease in intensity is due to concentration quenching. The change in the intensity with active doping of Mn into the zinc silicate lattice is shown in FIG. 8a. As mentioned above, decay of the phosphor is dependent on the impurity concentration (Mn) doped into the lattice of zinc silicate. FIG. 8b shows the variation of decay time with Mn concentration. In the case of a phosphor prepared by high temperature solid state reaction, all the manganese added to the starting materials may not be doped into the lattice. Some portion may exist in the material as a separate phase, may be present in the form of a manganese oxide or may doped in to the lattice as unwanted $Mn^{3+}$ or $Mn^{4+}$.

Further details of this invention will be described in the following examples.

EXAMPLE I

The preparation of an improved Mn activated zinc silicate phosphor employing zinc nitrate and acid catalyzer is described in this example. The following starting materials were used in the present example. The amounts are provided in grams. Weight percentages per batch are shown in Table I:

TABLE I

| Starting Material | Quantity | Element | Wt. % |
|---|---|---|---|
| Zinc Nitrate | 35.53 g | 12.26 g | 57.10 |
| Manganese Nitrate | 2.14 g | 0.66 g | 3.00 |
| TEOS (0.8M) | 125 CC | 2.79 g | 12.64 |
| Water (DI) | 1.5 L | — | — |
| Nitric Acid (0.65M) | 3.0 CC | — | — |

The above nitrates were dissolved in water in a round bottom flask. Required quantities of TEOS were added slowly to the nitrate solution while stirring at 45° C.; nitric acid was added dropwise when the solution attained a maximum required temperature (90° C.) and the solution was peptized at that temperature for about 9 hours. A water condenser column was maintained at 20° C. throughout the peptization with a circulating chiller. After cooling the flask to room temperature, the solution (semi-gel) was transferred to a crystallizing dish (3L capacity) and left in an open atmosphere. After 5 to 6 days, the solution had become a gel.

The transparent hard gel was dried at 45 to 50° C. for 12 hours in a lab oven. The dried product resembled a soft glass called xerogel. The xerogel was transferred in to a clean crucible (high grade alumina) and fired in a programmable box furnace at 100° C. for 2 hours and then at 400° C. for 2 more hours (the rate of heating was 2°/min). The loose mass from the crucible was crushed in a ball mill. After crushing, a fine powder was collected into a crucible and fired in a box furnace at 400° C. for 2 hours (rate of heating was 3°/min) and then at 1050° C. for 6 hours with same rate of heating to decompose the powdered xerogel. The sample was left in the furnace until it cooled to room temperature. Very fine phosphor powder obtained from the crucible was then washed with mild acetic acetic (0.001M) acid or succinic acid (0.001M) and dried at 100° C. for 6 hours. An elemental analysis of the above phosphor is shown in Table II:

TABLE II

| Element | % by wt. |
|---|---|
| Zn | 56.7 |
| Mn | 3.0 |
| Si | 13.6 |
| C | 0.2 |
| H | 0.0 |
| N | 0.0 |

EXAMPLE II

The preparation of an improved Mn activated zinc silicate phosphor employing zinc nitrate and base catalyzer is described in this example. The following starting materials were used in the present example. The amounts are provided in grams. The weight percentages per batch are shown in Table III:

TABLE III

| Starting Material | Quantity | Element | Wt. % |
|---|---|---|---|
| Zinc Nitrate | 35.53 g | 12.26 g | 57.10 |
| Manganese Nitrate | 2.14 g | 0.66 g | 3.00 |
| TEOS (0.8M) | 125 CC | 2.79 g | 12.64 |
| Water (DI) | 1.5 L | — | — |
| Ammonium Hydroxide | 20 CC | — | — |

The above nitrates were dissolved in water in a round bottom flask. The TEOS was added slowly to the nitrate solution while stirring at 45° C. The solution was peptized at 80° C. and for about 12 hours. The remainder of the preparative procedure was same as in Example I. An elemental analysis of the resulting phosphor is shown in Table IV:

TABLE IV

| Element | % by wt. |
|---|---|
| Zn | 56.7 |
| Mn | 3.0 |
| Si | 13.6 |
| C | 0.2 |
| H | 0.0 |
| N | 0.0 |

EXAMPLE III

The preparation of an improved Mn activated zinc silicate phosphor employing zinc chloride and acid catalyzer is described in this example. The following starting materials were used in the present example. The amounts are provided in grams. Weight percentages per batch are shown in Table V:

TABLE V

| Starting Material | Quantity | Element | Wt. % |
|---|---|---|---|
| Zinc Nitrate | 25.57 g | 12.26 g | 57.10 |
| Manganese Nitrate | 2.14 g | 0.66 g | 3.00 |
| TEOS (0.8M) | 125 CC | 2.79 g | 12.64 |
| Water (DI) | 1.5 L | — | — |
| hydrochloric acid (0.5M) | 3.0 CC | — | — |

The zinc chloride and manganese nitrate were dissolved in water in a round bottom flask. The TEOS was added slowly to the solution with stirring at 45° C. Hydrochloric acid was added dropwise when the solution attained the maximum required temperature (90° C.) and the solution was peptized at that temperature for about 9 hours. The remainder of the procedure was the same as in Example I. An elemental analysis of the above phosphor is shown in Table VI:

TABLE VI

| Element | % by wt. |
|---------|----------|
| Zn | 51.5 |
| Mn | 3.0 |
| Si | 16.1 |
| C | 0.01 |
| H | 0.1 |
| N | 0.0 |
| Cl | <0.38 |

EXAMPLE IV

The preparation of an improved Mn activated zinc silicate phosphor employing zinc chloride and base catalyzer is described in this example. The following starting materials were used in the present example. The amounts are provided in grams. Weight percentages per batch were as shown in Table VII:

TABLE VII

| Starting Material | Quantity | Element | Wt. % |
|-------------------|----------|---------|-------|
| Zinc Nitrate | 25.57 g | 12.26 g | 57.10 |
| Manganese Nitrate | 2.14 g | 0.66 g | 3.00 |
| TEOS (0.8M) | 125 CC | 2.79 g | 12.64 |
| Water (DI) | 1.5 L | — | — |
| Ammonium Hydroxide | 20 CC | — | — |

The above zinc chloride and manganese nitrate were dissolved in water in a round bottom flask. The TEOS was added slowly to the solution while stirring at 45° C. The solution was peptized at 80° C. for about 12 hours. The remainder of the procedure was the same as described in Example II. An elemental analysis of the resulting phosphor is shown in Table VIII:

TABLE VIII

| Element | % by wt. |
|---------|----------|
| Zn | 56.93 |
| Mn | 3.00 |
| Si | 15.54 |
| C | 0.0 |
| H | 0.3 |
| N | 0.0 |
| Cl | <0.38 |

The emission and decay characteristics of the phosphors of Examples I through IV and commercially available phosphors for PDP applications were studied after excitation with a 147 nm excitation source and a Xe flash lamp. The results of this study are given in Table IX. For the purpose of comparison, the average particle sizes of the phosphors are also provided.

TABLE IX

| Phosphor* | Peak Max (nm) | Intensity (AU) | Decay (10%) (ms) | Color Coordinates | | Particle Size (microns) |
|-----------|---------------|----------------|-------------------|-------------------|---|-------------------------|
|           |               |                |                   | x | y |                         |
| (Ex.1) | 524 | 109 | 8 | .227 | .697 | 0.1–2 |
| (Ex.2) | 525 | 102 | 11 | .221 | .701 | 0.5–5 |
| (Ex.3) | 524 | 107 | 7 | .226 | .696 | 0.1–2 |
| (Ex.4) | 525 | 100 | 11 | .220 | .695 | 0.5–5 |
| Commercial 1 | 523 | 96 | 14 | .211 | .716 | 4–7 |
| Commercial 2 | 525 | 100 | 18 | .234 | .707 | 4–7 |
| Commercial 3 | 521 | 92 | 13 | .221 | .699 | 3–6 |
| Commercial 4 | 528 | 86 | 16 | .247 | .716 | 3–10 |
| Commercial 5 | 528 | 90 | 16 | — | — | 2–14 |
| Commercial 6 | 525 | 110 | 31 | .206 | .716 | 3–5 |

*Phosphor Ex1 to Ex 4 are from the above examples. Commercial Phosphor 1 to 4 are for plasma display panels. Commercial phosphor 5 is for fluorescent lamp applications and commercial phosphor 6 is for cathode ray tube applications.

The Commercial 1–6 phosphors are manganese activated zinc silicates and were obtained from the following sources:

Commercial 1: Kasei Optonix, Ltd. Tokyo, Japan;

Commercial 2: Nichia Chemical Ind. Ltd., Tokyo, Japan;

Commercial 3: Phosphor Technology, Ltd, Essex, England;

Commercial 4 and 5: Osram Sylvania Prod. Inc. Towanda, Pa.

Commercial 6: Nichia Chemical Ind. Ltd., Tokyo, Japan.

As the data of Table IX demonstrates, the phosphors of Examples 1 through 4, formed using the sol/gel process of the present invention, provide reduced persistance, while generally also providing a higher level of intensity.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method of forming a manganese activated zinc silicate phosphor having the empirical formula:

$Zn_{(2-x)}Mn_xSiO_4$ wherein 0.005<x<0.15; said method comprising the steps of;

a) reacting a dilute solution comprising a source of zinc, a source of manganese and tetraethyl orthosilicate to provide a source of silicon and to form a gel over a period of days;

b) drying and heating said gel over a period that enables creation of a xerogel;

c) reducing said xerogel to a powder; and d) heating said powder to a range of about 900° C. to 1200° C. for two to twelve hours to obtain said phosphor.

2. The method of claim 1, wherein said source of zinc, said source of manganese and said organic precursor providing a source of silicon are reacted in an acid medium.

3. The method of claim 1, wherein said source of zinc, said source of manganese and said organic precursor providing a source of silicon are reacted in a base medium.

4. The method of claim 1, wherein said source of zinc is selected from the group consisting of zinc nitrate and zinc chloride, and said source of manganese is manganese nitrate.

5. The method of claim 1, wherein substantially all the manganese activator occupies available zinc sites as $Mn^{2+}$.

6. The method of claim 1, wherein said powder from xerogel is thermally decomposed in an open atmosphere, and said powder is heated at a temperature equal to or less than 1050° C.

7. The method of claim 1, wherein said source of zinc is zinc nitrate and said phosphor has spherical shaped particles having an average particle size in the range of 0.1 to 3.0 microns.

8. The method of claim 4, wherein said source of zinc is zinc chloride and said phosphor has needle-shaped particles having an average particle size in the range of 0.1 to 3.0 microns.

9. The method of claim 1, wherein said phosphor comprises from about 51.5 wt. % to about 57 wt. % zinc, from about 13.6 wt. % to about 16.1 wt. % silicon and about 3 wt. % manganese.

10. The method of claim 1, wherein step d) heats said powder for about twelve hours at 900° C. or for about two hours at 1200° C., as the case may be, and for a duration between two and twelve hours, dependent upon the heating temperature, said duration shorter with increased temperature and longer with decreased temperature.

* * * * *